US007486621B2

United States Patent
Bessis et al.

(10) Patent No.: US 7,486,621 B2
(45) Date of Patent: Feb. 3, 2009

(54) METHOD AND APPARATUS FOR LOAD SHARING AND OVERLOAD CONTROL FOR PACKET MEDIA GATEWAYS UNDER CONTROL OF A SINGLE MEDIA GATEWAY CONTROLLER

(75) Inventors: Thierry Bessis, Naperville, IL (US); Marianne Picha, Batavia, IL (US); Xin Tao, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1257 days.

(21) Appl. No.: 10/449,562

(22) Filed: May 30, 2003

(65) Prior Publication Data

US 2004/0240389 A1    Dec. 2, 2004

(51) Int. Cl.
*H04L 12/26* (2006.01)
(52) U.S. Cl. ..................................... 370/236
(58) Field of Classification Search ......... 370/229–240, 370/395.2, 395.21, 252, 253, 328, 338; 709/235, 709/238–241
See application file for complete search history.

(56) References Cited

U.S. PATENT DOCUMENTS

| | | | | |
|---|---|---|---|---|
| 6,628,629 B1* | 9/2003 | Jorgensen | ................... | 370/322 |
| 6,744,768 B2* | 6/2004 | Vikberg et al. | ......... | 370/395.21 |
| 6,904,017 B1* | 6/2005 | Meempat et al. | ............ | 370/238 |
| 6,985,480 B2* | 1/2006 | Brown | ........................ | 370/352 |
| 7,260,060 B1* | 8/2007 | Abaye et al. | ................ | 370/230 |

OTHER PUBLICATIONS

ITU-T Recommendation H.248, Gateway control protocol (Jun. 2000).
ITU-T Recommendation H.248.10, Gateway control protocol: Media gateway resource congestion handling package (Jul. 2001).
ITU-T Recommendation H.248.11, Gateway control protocol: Media gateway overload control package (Nov. 2002).

* cited by examiner

*Primary Examiner*—Huy D Vu
*Assistant Examiner*—Alex Skripnikov

(57) ABSTRACT

A method and apparatus for load balancing and overload control of packet media gateways under control of a single media gateway controller is provided. More particularly, the invention is directed to a technique for load balancing and overload control by defining an interface between the media gateway (MG) and the media gateway controller (MGC) to handle both load balancing as well as general congestion and resource congestion. In addition, a new event strategy is defined that reports resource utilization so that the media gateway controller (MGC) can take appropriate action to maximize call completion. Such action may include evenly distributing traffic among available media gateways, smart routing around a congested media gateway or intelligent throttling of traffic based on knowledge of specific resources that are congested.

22 Claims, 3 Drawing Sheets

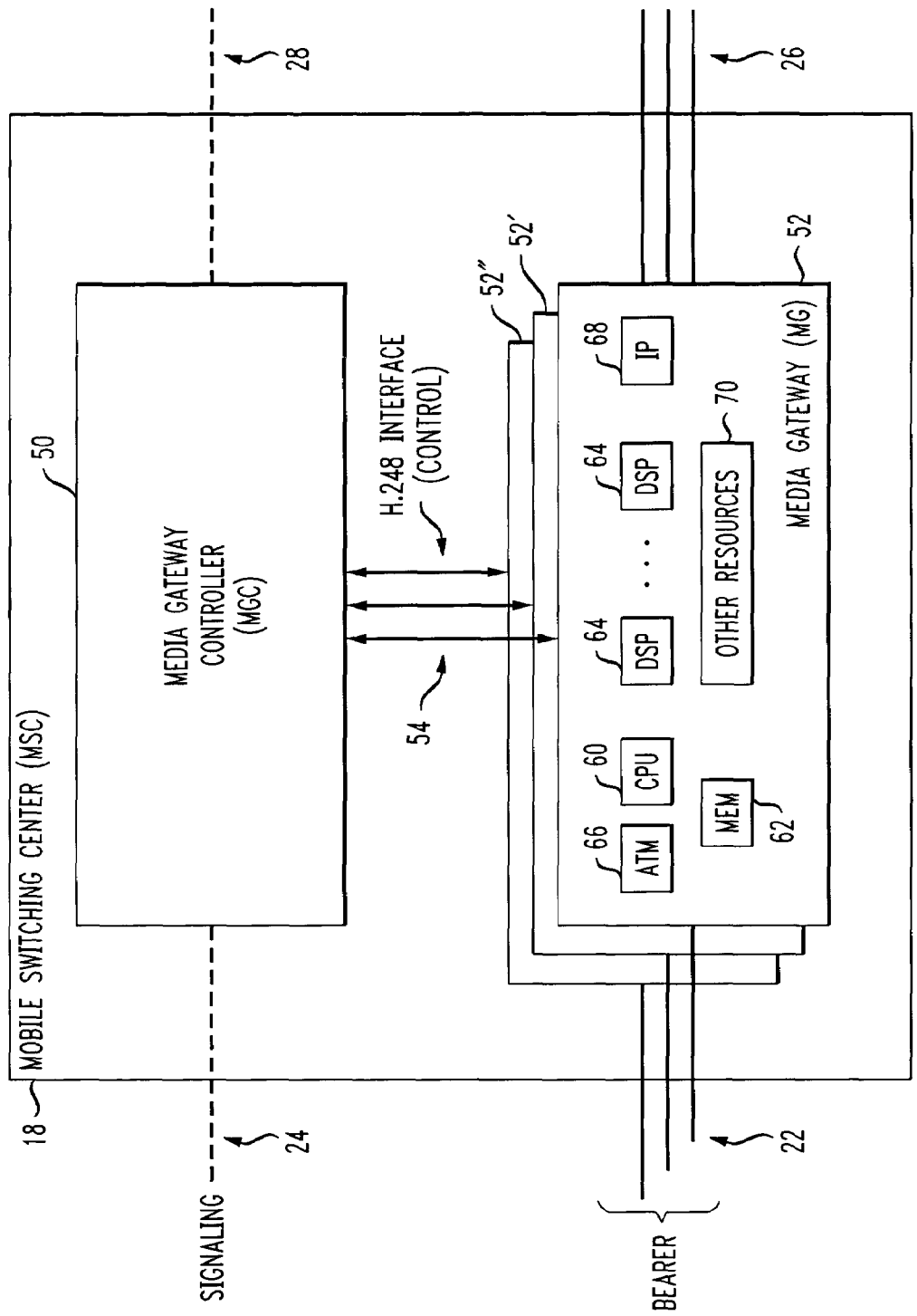

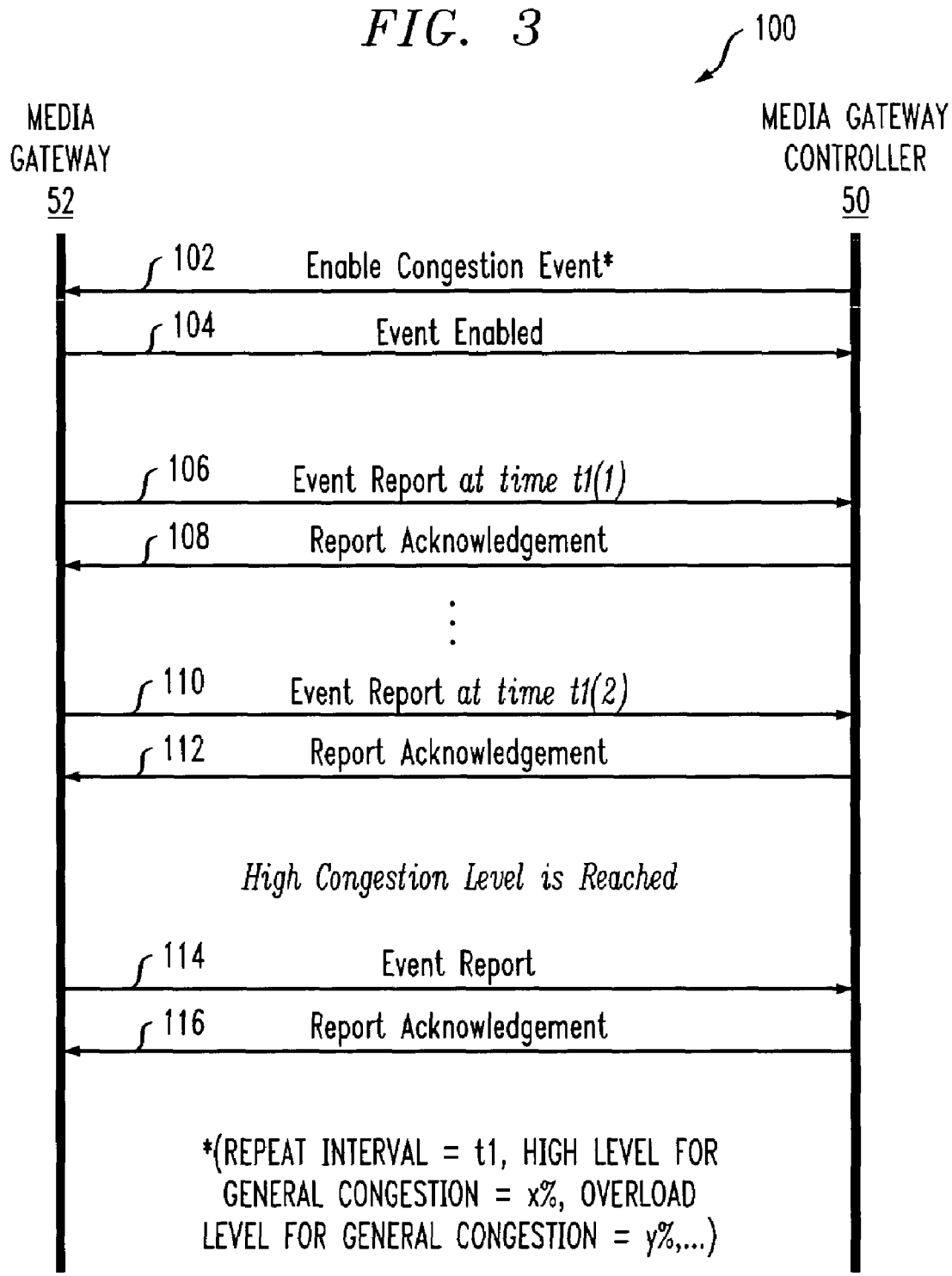

METHOD AND APPARATUS FOR LOAD SHARING AND OVERLOAD CONTROL FOR PACKET MEDIA GATEWAYS UNDER CONTROL OF A SINGLE MEDIA GATEWAY CONTROLLER

BACKGROUND OF THE INVENTION

This invention relates to a method and apparatus for load sharing and overload control of packet media gateways under control of a single media gateway controller. More particularly, the invention is directed to a technique for load sharing and overload control implemented by defining an interface between a media gateway (MG) and a media gateway controller (MGC) to handle both general and resource usage and congestion. In addition, a new event strategy is defined that allows for reporting of resource utilization so that the media gateway controller (MGC) can take appropriate action to maximize call completion. Such action may include evenly distributing traffic among available media gateways, smart routing around a congested media gateway or intelligent throttling of traffic based on knowledge of specific resources that are congested.

While the invention is particularly directed to the art of traffic balancing and overload management for media gateways, and will be thus described with specific reference thereto, it will be appreciated that the invention may have usefulness in other fields and applications. For example, the invention may be used in any traffic management technique where it is desirable for a controller to manage traffic in the absence of detailed information on hardware components through which the traffic flows.

By way of background, a typical method by which a media gateway controller determines and manages the resource capacity of a media gateway is to count resources until some provisioned maximum is reached. To do so, the media gateway controller is provisioned to understand the equipment in the media gateway.

However, this type of arrangement is not desirable in all circumstances. It requires that the media gateway controller possess detailed information on hardware components through which the traffic flows. It also requires that the media gateway keep dynamic counters to depict the usage of the hardware components. This type of solution is not robust and requires great effort to keep the counters in synchronization with the real hardware usage. It would be desirable to provide a technique that allows the media gateway controller to operate without explicit knowledge of resource capacity in each media gateway.

The recognized standard for media gateway control, and specifically control of the interface between the media gateway controller and the media gateway, is set forth in ITU-T Recommendation H.248 (June 2000), which is incorporated herein by reference. Currently there exist H.248 (ITU-T Recommendation H.248.10 (July 2001) and ITU-T Recommendation H.248.11 (November 2002)—which are incorporated herein by reference) packages for congestion and overload management. For example, an overload control package defined in H.248.11 is based on a command structure whereby the media gateway (MG) sends Notify commands to the media gateway controller (MGC) in response to Add attempts that are made while the media gateway (MG) is in overload. This approach requires that the media gateway controller (MGC) maintain control algorithms and "leaky bucket" counters to determine throttle percentages based on the state of the counters. This approach generates extra messaging during periods of congestion and only handles general media gateway congestion.

Another approach to resource capacity overload involves setting arbitrary thresholds for reducing traffic problems. For example, a congestion package defined in H.248.10 provides for reporting between the media gateway and the media gateway controller. The media gateway reports to the media gateway controller a predetermined percentage of traffic to throttle, or reject. This approach also only handles general media gateway congestion. Another deficiency of this approach is that it is reactive in nature, only informing the media gateway after there is already a problem.

The present invention contemplates a new and improved system that resolves the above-referenced difficulties and others.

SUMMARY OF THE INVENTION

A method and apparatus for load sharing and overload control for packet media gateways under control of a single media gateway controller are provided. A media gateway (MG) is controlled by a media gateway controller (MGC) and an interface is provided therebetween.

In one aspect of the invention, the method includes setting a reporting interval, setting, for each resource of interest, a first threshold level associated with a first level of traffic, setting, for each resource of interest, a second threshold level associated with a second level of traffic, querying the media gateway by the media gateway controller through the interface to determine resource usage of the media gateway, determining the resource usage of the media gateway by the media gateway, reporting the resource usage of the media gateway to the media gateway controller through the interface upon at least one of expiration of the reporting interval or the occurrence of a traffic level crossing the first or second threshold and, controlling the media gateway based on the reporting.

In another aspect of the invention, the reporting interval is tunable in the range of 1 through 10 seconds.

In another aspect of the invention, the first level of traffic is a high level. The high level indicates that traffic should be routed away from the media gateway if possible.

In another aspect of the invention, the second level of traffic is an overload level. The overload level indicates that traffic should be either routed away from the media gateway or it should be throttled.

In another aspect of the invention, determining the resource usage comprises determining general usage level of the media gateway. General usage pertains to resources that are needed to service any type of traffic in the media gateway (for example, processor occupancy or available memory).

In another aspect of the invention, determining the resource usage comprises determining usage level of digital signal processor in the media gateway.

In another aspect of the invention, determining the resource usage comprises determining bandwidth usage levels of the media gateway.

In another aspect of the invention, determining the resource usage comprises determining the resource usage for any other media gateway resource that is of interest between the media gateway and the media gateway controller.

In another aspect of the invention, controlling comprises balancing the traffic load across all of the available media gateways based on the current resource usage within each of the media gateways.

In another aspect of the invention, controlling comprises selectively rejecting new traffic to be processed by the media gateway.

In another aspect of the invention, controlling comprises selectively avoiding the media gateway. The avoidance can be general in nature (i.e. all traffic), or specific in nature (i.e. only traffic that requires, for example, a digital signal processor).

In another aspect of the invention, a system for implementing the method of the present invention is provided.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 2 is an illustration of an embodiment of network components into which the present invention is incorporated; and, FIG. 3 is a sequence, or flow, diagram illustrating the overload management techniques according to the present invention.

DETAILED DESCRIPTION OF THE PREFERRED EMBODIMENTS

Figure 1:
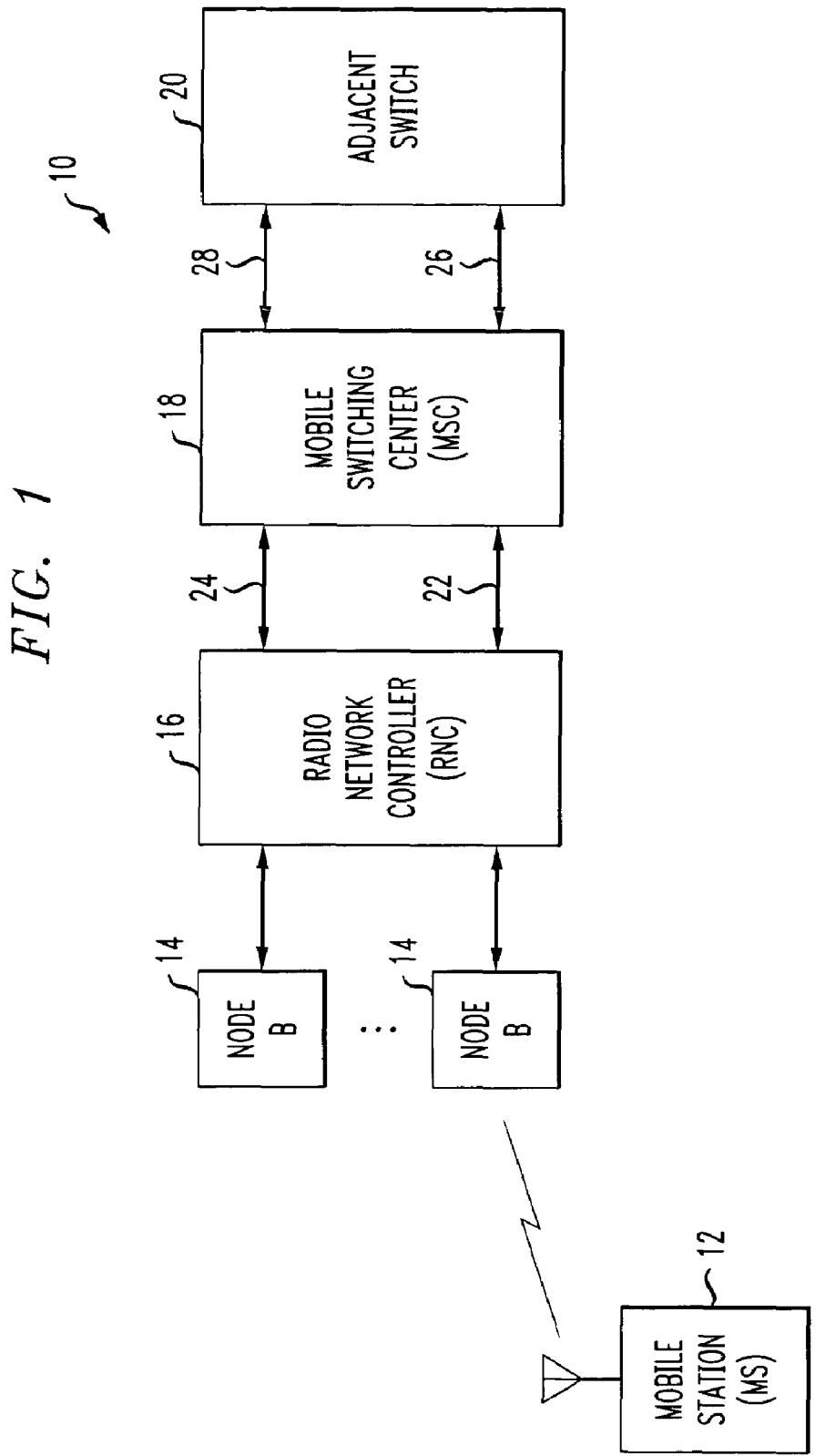
FIG. 1 is an illustration of an exemplary network into which the present invention may be incorporated.

Referring now to the drawings wherein the showings are for purposes of illustrating the preferred embodiments of the invention only and not for purposes of limiting same, FIG. 1 provides a view of the an exemplary network into which the present invention may be incorporated. As shown, a network 10 comprises a collection of mobile stations 12, Node Bs 14, RNCs 16 and MSCs 18 and 20. For simplicity, only two (2) NobeBs, one (1) RNC, one (1) MSC, and one (1) other switch are shown; however, it will be appreciated that the network 10 may well have pluralities of those elements disposed therein. The mobile station (MS) 12 communicates via an air interface with any one of a variety of NodeB elements, or base station transceivers, 14 depending on the geographic location of the mobile station (MS) 12. NodeB elements 14 are connected to a radio network controller (RNC) 16 which communicates with a mobile switching center (MSC) 18. In the example shown, mobile switching center (MSC) 18 is also in communication with an adjacent switch 20. The adjacent switch 20 may take a variety of forms that are well known to those skilled in the art.

Note that the radio network controller (RNC) 16 communicates with the MSC 18 through signaling and traffic handling techniques that are well known in the art. Specifically, the radio network controller 16 provides bearer, or data, traffic 22 to the mobile switching center (MSC) 18 as well as signaling data 24. Likewise, the mobile switching center (MSC) 18 provides bearer, or traffic data, 26 to the adjacent switch 20, as well as signaling data 28. Along these lines, it is to be appreciated that the network components identified in FIG. 1 (as well as FIG. 2) operate and function in ways that are well known in the art, except for the specific implementations of the present invention that are accommodated thereby and will be described hereafter.

The structure of the mobile switching center (MSC) 18 is illustrated in FIG. 2. As shown, the mobile switching center (MSC) 18 has included therein a media gateway controller (MGC) 50 that communicates with a plurality of media gateways (MGs) 52, 52', 52" (and possibly others). For simplicity, the invention will be described primarily in terms of media gateway (MG) 52; however, it should be understood that the invention may be similarly applied to all other media gateways. An interface 54 is provided between the media gateway controller (MGC) 50 and each media gateway. The interface 54 is a control interface that preferably operates under the H.248 standard.

With reference to both FIGS. 1 and 2, signaling data 24 is provided to the media gateway controller (MGC) and the bearer, or traffic, data 22 is provided to each of the media gateways (MG) 52, 52', 52". Likewise, signaling data 28 is generated and transmitted from the media gateway controller. In addition, the bearer, or data, traffic 26 is transmitted from the media gateways to the adjacent switch 20. Again, these functions are well known in the art.

It is to be appreciated that the media gateway controller 50 may take a variety of forms and may also be referred to as a soft switch (SS) in the art. Relative to the present invention, and beyond normal media gateway controller functions, the media gateway controller (MGC) 50 is operative to perform tasks to implement the present invention such as querying the media gateway (MG) 52 to determine current resource usage and to determine reporting capabilities of the media gateway (MG) 52 to support the present invention. As will be described in more detail below, the media gateway controller (MGC) 50 is also operative to modify the properties by setting reporting intervals (preferably tunable in the range of 1-10 seconds) and traffic levels for each resource of interest within the media gateway (MG) 52 (e.g. using a "high" traffic level and an "overload" traffic level) using Modify commands of the H.248 command structure. A default for these settings may also be provided. These tasks, as well as the tasks and functions performed by the media gateway (MG) 52, are implemented using various software and hardware techniques that will be apparent to those skilled in the art upon reading of the present disclosure. It should also be understood that the threshold values may vary and depend on a variety of different factors such as network configuration, traffic, . . . etc.

The media gateway 52 performs a variety of functions that are well known in the art. For example, the media gateways perform switching functions, media conversion functions, echo cancellation, transport conversion, and tone generation. In addition to these well known functions, in accordance with the present invention, the media gateway (MG) 52 provides a reporting function to the media gateway controller (MGC) 50 such that the media gateway controller (MGC) 50 obtains information on the resource utilization of the media gateways. Of significance, this approach does not require the media gateway controller (MGC) 50 to possess detailed information about all of the media gateway resources. This reporting is preferably accomplished using the H.248 interface control structure.

It is to be further appreciated that the media gateway 52 may be comprised of a variety of components including a central processing unit (CPU) 60, memories 62, digital signal processors 64, and components that accommodate asynchronous transfer mode processes 66 and internet protocol processes 68. The media gateway (MG) 52 may also include other resources 70 dedicated to performing traffic processing functions within the media gateway.

The method and system according to the present invention accomplishes a number of objectives that are useful for load balancing and overload control of systems such as those described in connection with FIGS. 1 and 2. According to the present invention, the interface 54 is defined between the media gateway (MG) 52 and the media gateway controller (MGC) 50 to handle load balancing as well as both general congestion and resource congestion. In addition, a new event strategy is defined according to the present invention that allows for reporting of resource utilization from the media gateway (MG) 52 to the media gateway controller (MGC) 50 so that the media gateway controller (MGC) 50 can take appropriate action to maximize call completion. At a most basic level, the information provided by a single media gateway (MG) 52 allows the media gateway controller (MGC) 50 to distribute or balance the traffic load evenly across all of the available media gateways (e.g. 52, 52', 52"). Similarly, with the information provided by the media gateway (MG) 52, the media gateway controller (MGC) 50 may allow for smart routing around a congested media gateway. For example, traffic requiring the use of a digital signal processor can be routed to the media gateway with sufficient digital signal processor resources. In addition, decisions on throttling, or rejecting, of traffic can be based on knowledge of specific resources that are congested, as opposed to simply throttling all traffic. It is to be appreciated and understood that the functions of the media gateway controller to allow for load balancing, smart routing and/or throttling are well known to those skilled in the art and will not be repeated here.

More particularly, the present invention is directed to defining a single H.248 event to report all resource utilization information relative to the media gateway (MG) 52. To do so, the media gateway (MG) 52 reports on specific resources by providing a percentage to the media gateway controller (MGC) 50 of the resources that are actually used. Of course, it is to be appreciated that multiple events may alternatively be defined. However, such a configuration may not be as efficient as the implementation of a single H.248 event. In addition, it is to be appreciated that different types of reporting criteria could also be provided by the media gateway (MG) 52 to the media gateway controller (MGC) 50. For example, instead of using a "percentage used", a "percentage available" may be provided. In addition, a "number of resources available" or "used" could be provided—or a combination of these types of data may be provided. Still further, an arbitrary scale associated with different usage levels of different devices (e.g. a scale of 1 through 10) may also be used. As noted above, however, the preferred method is to use a "percentage used" basis as the criteria that is transmitted over the interface.

The media gateway (MG) 52 includes a variety of resources for processing traffic, as noted above, that are preferably tracked according to the present invention. For example, general resources such as CPUs or memories are monitored and tracked according to the present invention. In addition, the digital signal processors (DSPs) are tracked. It is also useful to monitor the available bandwidth. For example, the asynchronous transfer mode (ATM) bandwidth or the internet protocol (IP) bandwidth may be monitored by the system. In fact, any other media gateway resource that is of interest between the media gateway and the media gateway controller may also be usefully provided. It should be appreciated that the media gateways (MGs) according to the present invention may monitor the resource utilization a variety of ways which are well known in the art.

To implement the present invention, it is also useful to provide a strategy for reporting the resource usage of the resources of the media gateway (MG) 52 to the media gateway controller (MGC) 50. Preferably, the information on resource usage is provided to the media gateway controller (MGC) 50 when traffic level (in any resource of interest for which a threshold was set) crosses a predefined level (e.g. either increasing into or decreasing out of a high level or overload level) or upon the expiration of a predetermined reporting interval (e.g. every 1-10 seconds). Of course, it is to be appreciated that reporting may be accomplished solely upon either of these occurrences. However, the preference in this case is to provide a report from the media gateway (MG) 52 to the media gateway controller (MGC) 50 upon occurrence of either or both of the circumstances. Accordingly, the media gateway controller (MGC) 50 will provide a periodic reporting interval, and will also set thresholds for traffic levels. As implemented, a high traffic level and an overload traffic level are defined through the media gateway controller (MGC) 50. The media gateway (MG) 52 implements a method of hysteresis to prevent a ping pong of events when the actual resource percentage hovers around the boundary between the high and overload levels.

In operation, the media gateway controller (MGC) 50 balances the traffic load across all available media gateways based on current resource usage within each of the media gateways. If a high traffic level for specific resources is reported, new traffic will be routed to avoid the media gateway, if possible. However, if an overload traffic level for a specific resource is reported from the media gateway to the media gateway controller, no new traffic that requires the affected resource will be directed toward the media gateway.

As such, when the media gateway (MG) 52 reports to the media gateway controller (MGC) 50 that there is an overload of traffic, throttling, or refusal of new call attempts, may be accomplished. Preferably, only new requests will be throttled as opposed to throttling commands for calls, or contexts, that are already created by the media gateway.

The actual report—the form of which may vary but will preferably resemble the form of similar reports provided for different functions for the H.248 interface—that is provided from the media gateway (MG) 52 to the media gateway controller (MGC) 50 provides the current percentage used of the general resources (e.g. CPUs and memories), the digital signal processor (DSP) resources, the internet protocol (IP) bandwidth resources, the asynchronous transfer mode (ATM) bandwidth resources, as well as any other resource dedicated to performing traffic processing functions within the media gateway. For example, the report provided may take the form to reflect the following: Event Report (overall=a %, DSP=b %, ATM bandwidth=c %, IP bandwidth=d % . . . etc.) where a, b, c, d, . . . etc. are variables representing actual percentages. This report is sent from the media gateway (MG) 52 to the media gateway controller (MGC) 50 at regular reporting intervals or upon either entering or leaving a high traffic or overload condition.

The usage levels of each of the components are reported from the media gateway (MG) 52 to the media gateway controller (MGC) 50 as a current percentage. It is to be appreciated that the thresholds set for the high percentage and overload percentage may be read and rewritten by the media gateway controller (MGC) 50. However, the current percentage is a read-only element of data that is simply compared to the preset threshold percentages to assist in determining the course of action that should be undertaken by the media gateway controller.

Referring now to FIG. 3, an operation method according to the present invention will be described in connection with a sequence, or flow, diagram. It is to be understood that the method of the present invention described in connection with FIG. 3 may be implemented using a variety of appropriate hardware and software techniques. Of course, prior to operation, a reporting interval is established through the media gateway controller (MGC) 50. In addition, the media gateway controller (MGC) 50 may query the media gateway to determine current resource usage and to determine reporting capabilities of the media gateway (MG) 52 to support the present invention. For each resource of interest, a first threshold associated with a first, or high, traffic level is set along with a second threshold associated with a second level of traffic (e.g. overload condition). This information is maintained by the media gateway controller (MGC) 50. As shown, the media gateway controller (MGC) 50 enables a congestion event by modifying the media gateway (MG) 52 properties, as shown at 102. For example, the media gateway controller (MGC) 50 sends a message to the media gateway (MG) 52 such as Enable Congestion Event (repeat interval=t1, high level for general congestion=x %, overload level for general congestion=y %, followed by high and overload percentage settings for all the remaining resources of interest) where t1 represents a time interval and x and y are set thresholds. The media gateway (MG) 52 acknowledges by sending an event enable signal back to the media gateway controller (MGC) 50, as shown at 104, and determines the resource usage in ways that are well known. According to the method of the present invention, the media gateway (MG) 52 then periodically reports resource usage levels to the media gateway controller (MGC) 50 through an event report at time t1 (1), as shown at 106. The media gateway controller (MGC) 50 acknowledges this report, as shown at 108. This process continues for every time interval thereafter. For example, an event report at time t1 (2) is provided from the media gateway to the media gateway controller, as shown at 110. This report is acknowledged through a report acknowledgement, as shown at 112. This process continues for as long as determined by the parameters defined in the media gateway controller.

The method of the present invention also provides a reporting mechanism from the media gateway (MG) 52 to the media gateway controller (MGC) 50 when a high congestion level or overload condition is reached. In this regard, an event report is issued from the media gateway to the media gateway controller, as shown at 114. Reporting acknowledgement is also provided, as shown at 116.

As noted above, the report that is issued from the media gateway (MG) 52 to the media gateway controller (MGC) 50 may contain information on a variety of media gateway resources. For example, the report may contain information regarding general usage levels of the media gateway, usage levels of the digital signal processor in the media gateway, bandwidth usage levels of the media gateway, as well as any other resource dedicated to performing traffic processing functions within the media gateway. The information provided in the report as described herein should not be interpreted as being limiting but merely exemplary of the types of information on the media gateway resources that satisfy the objectives of the present invention.

It is to be further appreciated that the media gateway controller (MGC) 50, as noted above, may act on the reports received from the media gateway (MG) 52 to efficiently manage traffic according to the objectives of the present invention. In this regard, the media gateway controller (MGC) 50 balances the traffic load across all available media gateways based on current resource usage within each of the media gateways. If a high level of traffic is reported for a particular resource, new traffic requiring that particular resource is routed around that particular media gateway if possible. In the situation where an overload condition is reported by a media gateway (MG) 52 to the media gateway controller (MGC) 50, all new traffic is either routed around the media gateway or throttled so that there is no possibility that new traffic will be handled by the overloaded media gateway.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for load balancing and overload control of traffic flowing through a media gateway, the media gateway having resources of interest for load balancing and overload control of traffic and being controlled by a media gateway controller, an interface being defined therebetween, the method comprising steps of:

setting a reporting interval;

setting, for each resource of interest, a first threshold level associated with a first level of the traffic;

setting, for each resource of interest, a second threshold level associated with a second level of the traffic;

querying the media gateway by the media gateway controller through the interface to determine a current resource usage of the media gateway;

determining the current resource usage of the media gateway by the media gateway wherein determining the resource usage comprises determining usage levels of a digital signal processor in the media gateway;

reporting the current resource usage of the media gateway to the media gateway controller through the interface upon at least one of expiration of the reporting interval or the occurrence of a traffic level crossing the first or second threshold; and, controlling the media gateway based on the reporting.

2. The method as set forth in claim 1 wherein the reporting interval is tunable in a range of 1 through 10 seconds.

3. The method as set forth in claim 1 wherein the first level of traffic is a high level.

4. The method as set forth in claim 1 wherein the second level of traffic is an overload level.

5. The method as set forth in claim 1 wherein determining the resource usage comprises determining general usage levels of the media gateway.

6. The method as set forth in claim 1 wherein the reporting comprises reporting using a recommendation H.248 interface control structure.

7. The method as set forth in claim 1 wherein determining the resource usage comprises determining bandwidth usage levels of the media gateway.

8. The method as set forth in claim 1 wherein determining the resource usage comprises determining at least one of: available asynchronous transfer mode (ATM) bandwidth, internet protocol (IP) bandwidth, central processing unit (CPU) availability, memory availability regarding the media gateway.

9. The method as set forth in claim 1 wherein the controlling comprises evenly balancing the new traffic across the media gateways.

10. The method as set forth in claim 1 wherein the controlling comprises selectively rejecting new traffic to be processed by the media gateway.

11. The method as set forth in claim 1 wherein the controlling comprises selectively avoiding the media gateway.

12. A system for load balancing and overload control of traffic flowing through a media gateway, the media gateway having resources of interest for load balancing and overload control of traffic and being controlled by a media gateway controller, an interface being defined therebetween, the system comprising:

means for setting a reporting interval;

means for setting, for each resource of interest, a first threshold level associated with a first level of traffic;

means for setting, for each resource of interest, a second threshold level associated with a second level of traffic;

means for querying the media gateway by the media gateway controller through the interface to determine resource usage of the media gateway, where the resource usage reflects resources available regarding at least one resource of interest;

means for determining the resource usage of the media gateway by the media gateway wherein determining the resource usage comprises determining usage levels of a digital signal processor in the media gateway;

means for reporting the resource usage of the media gateway to the media gateway controller through the interface upon at least one of expiration of the reporting interval or the occurrence of a traffic level crossing the first or second threshold; and, means for controlling the media gateway based on the reporting.

13. The system as set forth in claim 12 wherein the reporting interval is tunable in the range of 1 through 10 seconds.

14. The system as set forth in claim 12 wherein the first level of traffic is a high level.

15. The system as set forth in claim 12 wherein the second level of traffic is an overload level.

16. The system as set forth in claim 12 wherein the resource usage comprises general usage levels of the media gateway.

17. The system as set forth in claim 12 wherein the means for reporting comprises means for reporting using a recommendation H.248 interface control structure.

18. The system as set forth in claim 12 wherein the resource usage comprises bandwidth usage levels of the media gateway.

19. The system as set forth in claim 12 wherein the resource usage comprises usage levels regarding at least one of: asynchronous transfer mode (ATM) bandwidth, internet protocol (IP) bandwidth, a central processing unit (CPU), and memory of the media gateway.

20. The system as set forth in claim 12 wherein the controlling means comprises means for evenly balancing the new traffic across the media gateways.

21. The system as set forth in claim 12 wherein the controlling means comprises means for selectively rejecting new traffic to be processed by the media gateway.

22. The system as set forth in claim 12 wherein the controlling means comprises means for selectively avoiding the media gateway.

* * * * *